United States Patent
Puschini Pascual et al.

(10) Patent No.: US 8,904,200 B2
(45) Date of Patent: Dec. 2, 2014

(54) METHOD FOR OPTIMIZING THE OPERATION OF A MULTIPROCESSOR INTEGRATED CIRCUIT, AND CORRESPONDING INTEGRATED CIRCUIT

(75) Inventors: Diego Puschini Pascual, Grenoble (FR); Pascal Benoit, Montpellier (FR); Fabien Clermidy, Saint-Egreve (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 663 days.

(21) Appl. No.: 13/263,055

(22) PCT Filed: Apr. 6, 2009

(86) PCT No.: PCT/FR2009/050581
§ 371 (c)(1),
(2), (4) Date: Oct. 13, 2011

(87) PCT Pub. No.: WO2010/116047
PCT Pub. Date: Oct. 14, 2010

(65) Prior Publication Data
US 2012/0036375 A1    Feb. 9, 2012

(51) Int. Cl.
*G06F 1/26* (2006.01)
*G06F 1/32* (2006.01)
*G06F 9/50* (2006.01)

(52) U.S. Cl.
CPC .................................. *G06F 9/5027* (2013.01)
USPC ........... 713/300; 713/320; 713/330; 718/102; 718/104; 718/105

(58) Field of Classification Search
CPC ....... G06F 1/206; G06F 1/329; G06F 1/3203; G06F 1/3293; G06F 9/4881; G06F 9/4893; G06F 9/5066; G06F 9/5088; G06F 9/5094
USPC ........... 713/300, 320, 330; 718/102, 104, 105
See application file for complete search history.

(56) References Cited

U.S. PATENT DOCUMENTS

| 2004/0037346 A1 | 2/2004 | Rusu et al. | |
| 2007/0208956 A1* | 9/2007 | Lin et al. | 713/300 |

OTHER PUBLICATIONS

Puschini D. et al.: "Temperature-Aware Distributed Run-Time Optimization on MP-SoC Using Game Theory," Symposium on VLSI, 2008. ISVLSI '08. IEEE Computer Society Annual, IEEE, Piscataway, NJ, USA, Apr. 7, 2008, pp. 375-380.

(Continued)

*Primary Examiner* — Michael J Brown
(74) *Attorney, Agent, or Firm* — Baker & Hostetler LLP

(57) ABSTRACT

A method for optimizing operation which is applicable to a multiprocessor integrated circuit chip. Each processor runs with a variable parameter, for example its clock frequency, and the optimization includes determination, in real time, of a characteristic data value associated with the processor (temperature, consumption, latency), transfer of the characteristic data to the other processors, calculation by each processor of various values of an optimization function depending on the characteristic data value of the block, on the characteristic data values of the other blocks, and on the variable parameter, the function being calculated for the current value of this parameter and for other possible values, selection, from among the various parameter values, of that which yields the best value for the optimization function, and application of this variable parameter to the processor for the remainder of the execution of the task.

16 Claims, 4 Drawing Sheets

(56) References Cited

OTHER PUBLICATIONS

Diego Puschini et al.: "Game-Theoretic Approach for Temperature-Aware Frequency Assignment with Task Synchronization on MP-SoC," Reconfigurable Computing and FPGAS, 2008. Reconfig '08. International Conference on, IEEE, Piscataway, NJ, USA. Dec. 3, 2008, pp. 235-240.

S. Murali et al.: "Temperature-aware processor frequency assignment for MPSoCs using convex optimization," Proceedings of the 5th IEEE/ACM International Conference on Hardware/Software Codesign and System Synthesis, 2007, pp. 111-116.

* cited by examiner

METHOD FOR OPTIMIZING THE OPERATION OF A MULTIPROCESSOR INTEGRATED CIRCUIT, AND CORRESPONDING INTEGRATED CIRCUIT

CROSS-REFERENCE TO RELATED APPLICATIONS

This application is a National Stage of International patent application PCT/FR2009/050581, filed on Apr. 6, 2009, the disclosure of which is incorporated by reference in its entirety.

FIELD OF THE INVENTION

The invention relates to a method for optimizing the operation of an integrated circuit with multiple processors, and an integrated circuit comprising means for optimizing its operation in real time.

BACKGROUND OF THE INVENTION

Integrated circuits with multiple processors, known by the abbreviation MP-SoC (for "Multiprocessor System-on-Chip"), are formed on a single monolithic chip and offer very high processing capacities owing to the sharing of the tasks that can be accomplished by the various processors. The processors operate in communication with one another and the tasks are shared according to the application. The tasks are executed sequentially or in parallel, or both at the same time. Each application defines an operational program for all or part of the processors, and also defines exchange links between the various processors depending on the tasks to be accomplished.

Technological advances tend to increase the number of processors that can be placed on a chip. This number can reach several tens, or even several hundreds.

Among the problems arising during the operation of the chip, there is notably the problem of the dissipation of heat and the problem of the synchronization of the tasks being executed in order to minimize overall processing time. With regard to the dissipation of heat, local overheating of certain processors and also overall overheating of the chip need to be avoided. As far as the synchronization of the tasks is concerned, it is desirable to avoid too fast a production of results by a processor whereas another processor, waiting for these results in order to perform its own task, is not capable of processing it at the same rate; and conversely, it is desirable to avoid a processor waiting for results coming from another processor running at too slow a speed. Another parameter that is significant for the performance of the circuit can be a characteristic time, known as the "latency time", which represents the time needed for the processor (where it is the latency time of the processor) or an assembly of processors (where it is the latency time of an assembly of processors) to supply the result of a calculation after having received the input data required for this calculation.

The operation of the chip may be optimized at the design stage of the chip, by taking into account the questions of thermal dissipation and synchronization at this design stage. But this is not compatible with the fact that the operating conditions during a real execution will, to a large extent, depend on the application and that the operation cannot be optimized for all the applications that may be envisioned.

A solution already proposed is to monitor the risks of hot spots in the chip and to reconfigure the distribution of the tasks between the processors depending on the hot spots, estimated or measured, for example by transferring a power-hungry task from one processor to another processor, during the operation.

SUMMARY OF THE INVENTION

One aim of the invention is to provide a solution for optimizing, in real time, during the execution of an application, the operation of the entire chip by acting on the operating conditions of each of the processors, notably by acting on the frequency of an individual clock associated with each processor. The optimization sought is an optimization with multiple objectives, where one of the main objectives can be the monitoring of the energy consumed and another main objective can be the monitoring of the processing latency time. Furthermore, another aim of the invention is to provide an optimization method that is relatively independent of the number of processors, in order that this method be easily transposable from one chip to another without the change in the number of processors requiring a new design of the means of optimization to be undertaken.

According to the invention, a method is provided for optimizing the operation which is applicable to an integrated circuit chip comprising several processing blocks capable of executing respective tasks within a given application, each processing block comprising at least one processor. The term 'processor' will be used hereinafter in a very general sense as being a device performing a calculation. In this respect, an ASIC circuit executing a specific task is considered as a processor. The method comprises, for each processing block:
the execution of a task by the processor under the control of at least one variable parameter, such as the operating frequency or period of the processor or its supply voltage,
the determination in real time of at least one characteristic data value associated with the processing block during its operation, such as for example the temperature of the block or the power dissipated in the block or a latency time of the block, this characteristic data value being dependent on the value of the variable parameter,
the transfer of the characteristic data value to the other blocks and the reception of the corresponding characteristic data from the other blocks,
the calculation in the block of various values for an optimization function dependent on the characteristic data value of the block, on the characteristic data from the other blocks, and on the variable parameter, the function being calculated for the current value of the variable parameter of the block and for other possible values of this parameter,
the selection, from among the various values of the variable parameter, of that which gives the best value for the optimization function,
and the application of this selected value of the variable parameter to the processor for the remainder of the execution of the task.

This method is implemented simultaneously by all the processing blocks which each individually carry out a selection of the variable parameter value that is the most appropriate for the optimization of the operation of the block; this selection takes into account information sent by the other processors because the optimization function used by each processor depends on the state of operation of the other blocks (at least of some of them that are more closely interacting, functionally or geographically, with the block in question).

The operation optimization is performed individually block by block; a block can correspond to a processor where it is desired to optimize the chip by seeking an optimum solution based on each processor, but a block could also correspond to a group of processors where it is desired to seek an optimum solution using groups or "clusters" of processors.

In order to implement this method, another subject of the invention is an integrated circuit chip comprising several processing blocks each capable of executing a respective task depending on the application in which the chip is used, each processing block comprising at least one processor for executing the task, a communications element enabling the communication between this block and the other blocks, and a means of action on the operation of the processor in order to modify a variable parameter of this operation such as the operating frequency or period of the processor or its supply voltage, the chip being characterized in that each block furthermore comprises:

a means of determination, in real time, of at least one characteristic data value associated with this block during its operation, such as for example the temperature of the block or the power dissipated in the block or a latency time for calculations executed in the block, this characteristic data value depending on the value of the variable parameter, means for transferring the characteristic data value to the other blocks and for receiving the corresponding characteristic data from the other blocks, means for calculating various values of an optimization function depending on the characteristic data value of the block, on the characteristic data from the other blocks, and on the variable parameter, the function being calculated for the current value of the variable parameter of the block and for other possible values of this parameter, means for selecting from among the various values of the variable parameter that which yields the best value for the optimization function, and means for transmitting the value selected to the means of action for it to be applied to the processor.

The variable parameter is preferably the frequency (or, what amounts to the same thing, the period) of a clock included in the processing block, this clock defining an elementary processing cycle time of the processor. The variable parameter may also be the supply voltage of the processor, and it is also possible for these two parameters to be linked, a modification in frequency being effected at the same time as a modification in supply voltage; in this latter case, the frequency will preferably be used as variable parameter, but a modification of the supply voltage will be applied that will depend on the optimum value found for the frequency.

The characteristic data value associated with a processing block is preferably associated with the power consumed by the processing block during its operation, or with a contribution of the block to the power consumed; this power depends directly on the clock frequency of the processor (it increases with the frequency). The characteristic data value may also be a latency time for a calculation carried out in the block or, more generally, a contribution of the block to the overall latency of the chip within the application where it is operating; this latency time also depends on the clock frequency.

The optimization function itself can be a function for minimization of the energy or the power consumed, or a function for optimization of a latency time in the execution of a task by the chip, or alternatively, and preferably, a multi-objective optimization function taking into account both the power consumed and the latency time. This function is chosen in such a manner as to exhibit either a minimum or a maximum as a function of the variation of the variable parameter, the characteristic data of the other blocks being considered as fixed parameters; this minimum or this maximum defines the optimum for the value of the optimization function; the modification in real time of the variable parameter is applied in a direction tending toward this optimum.

In one particularly advantageous preferred embodiment, the calculation of the optimization function and the selection of a variable parameter value comprise:

the determination of the values of the optimization function for a current value of the variable parameter and for two other values encompassing this current value in a monotonic succession of possible values, the comparison of the value of the function for the current parameter and for the two other parameter values, and the selection of a new parameter value which is one of the two other values if and only if this other value yields a better value of optimization function.

In this embodiment, a direct search for the optimum value over the whole field of possible values of the variable parameter is not therefore carried out in order to find and apply an optimum value, but the value of the optimization function is observed for two values of variable parameter encompassing the current value, and one of these two values is immediately applied to the processor if it is observed that it will provide a better result than that provided by the current value; otherwise the current value is retained.

In order to enable an optimized state of the operation to be found in an efficient manner, it is very desirable for the optimization function chosen to have a convex or concave form (or quasi-convex or quasi-concave), depending on whether the optimization is a minimization or a maximization of the function, over the field of possible values of the variable parameter; this means that the chosen function, varying as a function of the variable parameter, must have a first order derivative passing through zero, positive on one side of zero, negative on the other side.

One advantageous manner of obtaining such an optimization function consists in adding together a main sub-function that varies in a monotonic manner over the whole field of possible values of the variable parameter and a secondary sub-function which varies in the opposite way toward a limit of this field, but which is small or zero over the rest of the field. More precisely, a secondary sub-function can be established that may be considered as a constrained penalty sub-function at the limit of the field, in other words a sub-function that penalizes the optimization function when the variable parameter approaches the limit of the field, and does this irrespective of the value of the main sub-function.

In one particular embodiment, the main sub-function that defines the optimization sought for a block is the value of a contribution of the processing block to the overall energy consumption of the chip; it is desired that this contribution, which decreases when the clock period increases, be minimized; and the penalty sub-function is a calculation latency constraint function which imposes a higher penalty the longer the clock period as it approaches the limit of the field of the periods. The sum of these two functions is a convex curve (or concave curve; in the following, the word convex will be used for simplicity) exhibiting a maximum or a minimum within the field of the possible clock periods.

In another embodiment, the main sub-function is the value of a calculation latency contribution within the overall latency of the tasks to be executed; the latency increases with the clock period; the secondary sub-function is an energy constrained penalty function which rises rapidly when the clock period decreases. The sum of these two functions is again a convex curve exhibiting a minimum in the field of the possible periods.

BRIEF DESCRIPTION OF THE DRAWINGS

Other features and advantages of the invention will become apparent upon reading the detailed description that follows and which is presented with reference to the appended drawings, in which.

DETAILED DESCRIPTION

Figure 1:
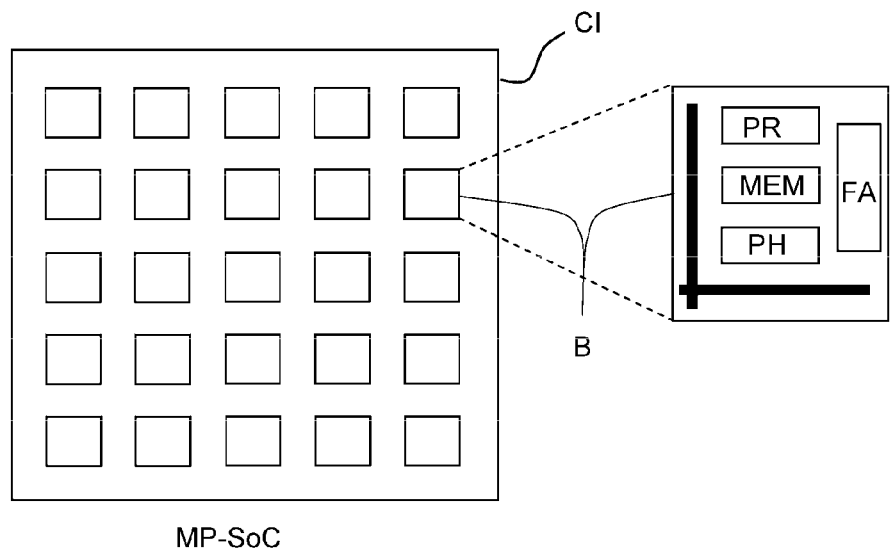
FIG. 1 shows an MP-SoC multiprocessor chip.

FIG. 1 shows schematically a monolithic integrated circuit chip CI with multiple processors or MP-SoC chip. The chip is designed to execute a complex global task, notably including digital processing operations, and the various processors will execute individual tasks contributing to the global task, some of these tasks being executable in parallel. The execution in parallel by several processors allows the execution of the global task to be accelerated. It is the application within which the chip operates that determines the division of the tasks and the allocation of the tasks to such and such a processor.

The processors are interconnected together and interconnected with the input-output ports of the chip via an interconnection network situated on the chip. This network is sometimes referred to as NoC (for Network-on-Chip).

Each chip is divided into n processing blocks B. The number n can be several tens or even several hundreds. For example n=80. A processing block comprises, for example, a processor PR, a memory MEM, peripheral circuits PER, and an interface COM for connection with the interconnection network. The block preferably also comprises a circuit FA for adjusting the clock frequency. The circuit FA can be a circuit that not only adjusts the operating frequency of the processor but also its supply voltage (DVFS or "Dynamic Voltage Frequency Scaling" circuit), notably when this voltage must depend on the operating frequency.

In FIG. 1, the processing blocks are shown as being squares that are all identical, but they may be different from one another, in geometry and in functionality, and each block could comprise several processors rather than a single one.

Figure 2:
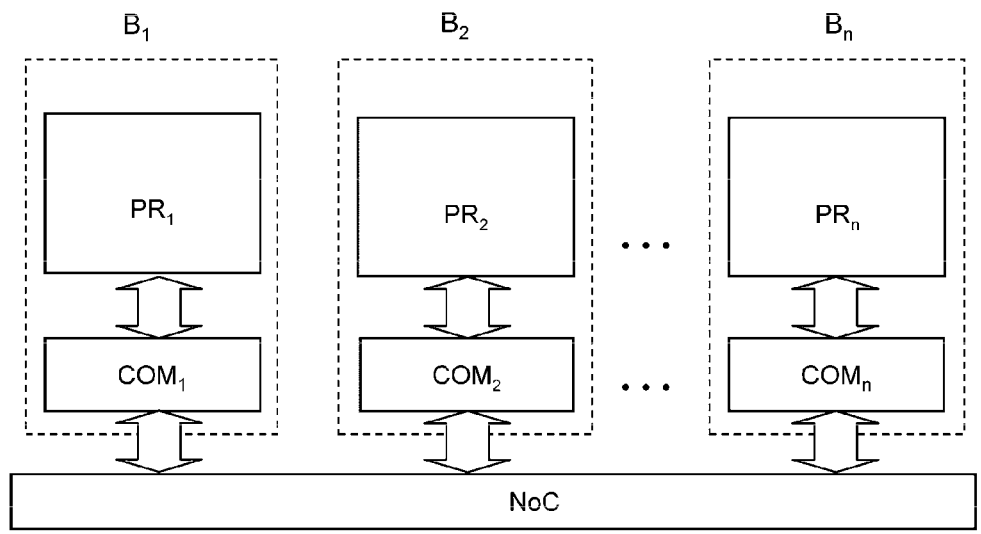
FIG. 2 shows schematically the organization of the chip with several processors connected together by a common communications network.

FIG. 2 shows schematically, in another form, the organization of the chip into n processing blocks $B_i$ ($B_1$ to $B_n$) of rank i=1 to n, interconnected together via a network NoC by means of respective interfaces $COM_i$ ($COM_1$ to $COM_n$) present in each block $B_i$.

Figure 3:
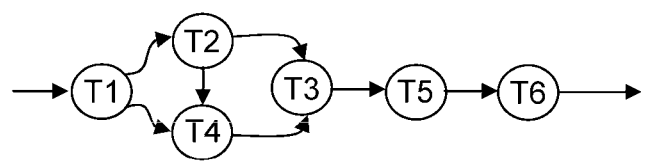
FIG. 3 shows a graph of execution of several tasks in an application.

FIG. 3 shows, by way of example, a global task to be accomplished, divided into six partial tasks T1 to T6 which will be executed by six different processing blocks $B_1$ to $B_6$.

Figure 4:
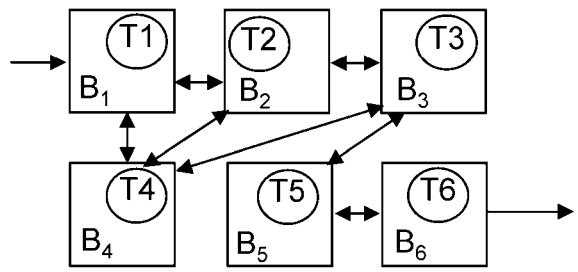
FIG. 4 shows several processors interconnected to perform the execution of the tasks in FIG. 3.

FIG. 4 shows a group of six processing blocks interconnected in such a manner as to perform the execution of the six tasks. Other interconnections, not shown, will be provided between the blocks, not for performing the execution of the application, but for the optimization according to the invention, the method of optimization involving each block receiving from the other blocks information on a characteristic data value describing the operation of these other blocks. The information can be information on their operating frequency or information on energy consumption or on processing latency time, or several different kinds of information simultaneously.

The synchronization of the tasks is important since, for example, the task T3 cannot be executed before the block $B_3$ has received the results from the processors of the blocks $B_2$ and $B_4$, the block $B_4$ can itself only supply results after having received results from the processor of the block $B_2$.

According to the invention, into each processing block will be incorporated specific means for optimizing the operation, these means using at least one characteristic data value relating to the processing block and characteristic data relating to the other processing blocks (or at least some of the other processing blocks). These specific means act on a variable parameter which controls the operation of the processor, notably its operating frequency, and they calculate an optimization function as a function of the characteristic data and as a function of the value of the variable parameter; the result of the optimization function is used to modify the value of the variable parameter in a direction that tends toward the optimization sought; in return, as a result of the modification of the variable parameter and hence the modification of the operation of the processor, the characteristic data are modified, such that the optimization function has a feedback action on the operation by way of the variable parameter.

The variable parameter will preferably be the frequency or period of the clock that controls the processor. The characteristic data relating to the processing block will preferably be, on the one hand, an energy consumed in the block, or a contribution of the block to the overall energy consumed by the chip, or a data value relating to this energy (which depends on the operating frequency and which, more precisely, increases with this frequency) and, on the other hand, a calculated parameter representing a relative desynchronization value between processors, or alternatively a contribution to the processing latency time for the application, which latency time also depends on the individual clock frequencies of the processors.

Each of the processing blocks $B_1$ to $B_n$ transmits information to the other blocks on the characteristic data relating to the block, and each block will then try to adjust its own variable parameter in a direction that yields an optimum value for the result of the calculation of the optimization function carried out in this block.

The optimization problem is thus distributed between the various processors which individually search for an optimum operation, by taking advantage of a certain knowledge of the state of operation of the other processors.

It may be considered that this problem is mathematically equivalent to the search for a theoretical global equilibrium situation, representing a set of individual equilibrium positions, which may be defined in the following manner: when all the processors are at their individual equilibrium position, if any one of them has a tendency to move away from its position, the result of its own optimization calculation would be degraded, such that it will individually try to remain in place.

This problem has been considered in the field of the mathematical theory of games. Game theory is a branch of applied mathematics which studies the interactions between rational individuals who try to optimize a result. In the theory of non-cooperative games, individuals are considered who individually choose the manner in which they take decisions, in order to increase a value of a result that is beneficial to them. The decision is taken individually by each player based on his knowledge of all of the other players. In the present invention, the individual processing blocks may be considered as individual players in a non-cooperative game, since they are equipped with individual means of decision and with individual means of action on their own operation, allowing them to tend toward an optimization according to a calculation that is specific to them, while at the same time possessing a certain knowledge of the state of the other players which are the other processing blocks.

The case will now be considered in more detail where the means of action is the selection of an operating frequency or period (which amounts to the same thing) of the processor, and where the optimization function is a search function for a compromise between the local temperature of the block (which it is desired to minimize but which increases with the frequency) and the processing time (which it is desired to minimize and which decreases with the frequency).

Optimization as a Function of the Temperature and the Synchronization:

In a simplified implementation, a local optimization function (in other words specific to each block) $O_{OPT}$ can be established which is the weighted sum of a value $O_{TEMP}$ characteristic of the local temperature in the block and of a value $O_{SYNC}$ characteristic of a tight or poor synchronization of the tasks.

$$O_{OPT} = a \cdot O_{TEMP} + b \cdot O_{SYNC}$$

a and b are weighting coefficients whose sum is equal to 1 and which depend, for each block, on the relative weight that it is desired to assign to the questions of temperature and to the questions of synchronization or of processing time. The relative weights, together with the characteristic data on temperature or on synchronization for the tasks, are individual to each processing block.

Thus, for the block of rank i, the following may be written:

$$O_{OPT,i} = a_i \cdot O_{TEMP,i} + b_i \cdot O_{SYNC,i}$$

The characteristic data value on temperature can for example be a function of the power consumed by the block, and of the power consumed by the blocks that are immediate neighbors which, by thermal conduction, contribute to the increase in temperature of the block in question.

In this case, the neighboring blocks must send an indication of the power that they are consuming to the block in question. A characteristic data value $O_{TEMP,i}$ can then be established based on a temperature calculation model taking into account the power consumed by the block $B_i$, the resistance to heat evacuation from the block, the powers of neighboring blocks $B_j$, the thermal resistance between the block of rank i and the neighboring blocks, etc.

With regard to the characteristic data value on synchronization, a simple model can be used that establishes a characteristic data value which is the sum of synchronization data values between pairs of blocks interconnected together for the accomplishment of their tasks. For example, the model consists in observing a synchronization data value between two blocks of rank i and j, respectively, which would be $A_{SYNC,i,j}$ equal to the modulus of the difference $|x_i \cdot f_i/L_i - x_j \cdot f_j/L_j|$ where $f_i$ and $f_j$ are the respective operating frequencies of the two blocks, $L_i$ and $L_j$ are the respective processing loads counted as a proportion of time spent working, and $x_i$ and $x_j$ are respective coefficients. The characteristic data value for the block i is then the sum of all the $A_{SYNC,i,j}$ for all the blocks of rank j functionally connected to the block i in the execution of the application.

The optimization function $O_{OPT,i}$ is particularly simple since it only needs to add together two sub-functions with respective weighting coefficients. It will be understood that a combination of more than two optimization sub-functions could be used.

The processing block will be locally equipped with means for calculating various values of the optimization function, on the one hand for the current value of the operating frequency of the block (the operating frequency being the variable parameter which will be acted on for optimizing the operation) and, on the other hand, for several other values of this frequency.

As a consequence, the processing block establishes a series of calculations for simulating the value that the optimization function would take for the various possible values of the operating frequency (for example a value from among the discrete succession of frequencies from 100 MHz to 300 MHz in steps of 5 MHz), including the current value of the frequency, and it does this taking into account the current characteristic data of the other processing blocks. Indeed, the result of the optimization function $O_{OPT,i}$ depends on the current state of the other blocks.

In this respect, it should be pointed out that the characteristic data representing the current operation of the other blocks can be transmitted in various forms. For example, it may be considered that, if the characteristic data value is an estimated temperature of another block, the information transmitted can be either a power consumed (calculated in the other block) or a temperature, detected by a local sensor in the other block, or else the data value $O_{TEMP,j}$ calculated in the other block.

Once the processing block of rank i has calculated the optimization function values for a series of possible values of operating frequency, it determines which is the frequency that yields the best result (maximum or minimum, depending on the case, of the function $O_{OPT,i}$) and it controls the application of this optimum frequency to the processor. This change of frequency, if it takes place, in other words if the processing block of rank i is not already at an optimum frequency, has repercussions on the other blocks which simultaneously perform calculations taking into account the block of rank i.

In the majority of cases, the blocks progressively converge toward an optimum solution whenever the optimization function has a convex or quasi-convex form depending on the variable parameter (frequency) that is used.

Optimization of Energy or Latency in the Presence of Latency or Energy Constraint:

In a more sophisticated implementation of the method according to the invention, an optimization function is used that involves the use of two sub-functions which are respectively a main sub-function to be optimized (energy or latency time for example) and a penalty sub-function, which defines a penalty for the optimization function in the case of too high an energy consumption or else which defines a penalty in the case of too high an overall latency time. The main sub-function varies with the clock period (the energy and the execution time increase with the period), the clock period $T_i$ of a processor $PR_i$ of rank i being considered here as being the variable parameter in the process of optimization. The penalty sub-functions are designed such that they have little or no influence on the value of the optimization function if the overall energy consumed and the overall latency time are below predetermined thresholds, but such that they greatly impair the optimization function when the overall energy or the latency time exceed these thresholds.

This way of formulating the optimization function allows it to be given a form of curve (as a function of the clock period) that is bound to exhibit an optimum, and consequently a convergence toward a state of equilibrium, where each processor adopts an optimum frequency of operation.

More precisely, an energy contribution of a processing block with respect to the overall energy consumption of the integrated circuit may be used as a main sub-function.

Optimization by the Energy Contribution:

The energy consumed by a processing block $B_i$ of rank i during the overall execution time T0 of the task assigned to the circuit comprises:
- a constant or static part $E_{STATi}$ independent of the clock frequency $f_i=1/T_i$ and equal to $T0 \cdot P_{STATi}$, where $P_{STATi}$ is the power continuously consumed with or without execution of tasks,
- a dynamic part of the operation with high consumption (during the active execution of a task by the block of rank i), being $E_{HDYN,i}$,
- and finally, a dynamic part with low consumption during other periods, being $E_{LDYN,i}$.

The energy $E_{HDYN,i}$ may be considered as equal to $N_i \cdot E_{N,i} \cdot T_{N,i}^2/T_i^2$ where $T_i$ is the clock period, $N_i$ is the number of clock periods needed for the active execution of the task for the processor $PR_i$ during the time T0; $E_{N,i}$ is the nominal energy consumption reference of the processor during a clock period of nominal duration $T_{N,i}$. The nominal period is for example, but not necessarily, situated in the middle of a discrete series of N possible periods of operation of the processor.

Outside of the time period in other words during a period equal to $(T0-N_i \cdot T_i)$, the power consumed is proportionally lower and the coefficient of proportionality may be called $\gamma_i$, less than 1, representing the drop in consumption when the processor is not in the process of executing its task.

The energy consumed in low-consumption mode is therefore $$E_{LDYN,i}=\gamma_i[(T0/T_i)-N_i] \cdot E_{N,i} \cdot T_{N,i}^2/T_i$$

The total energy consumed by the processing block of rank i when the clock period is $T_i$ is therefore:

$$E_i(T_i)=P_{STAT,i} \cdot T0+N_i \cdot E_{N,i} \cdot T_{N,i}^2/T_i^2+\gamma_i[(T0/T_i)-N_i] \cdot E_{N,i} \cdot T_{N,i}^2/T_i$$

The energies consumed by all the microprocessors for the execution of their respective tasks within the global task can therefore be calculated; $E_k(T_k)$ is the energy consumed by the processor $PR_k$ of any given rank k, operating with a clock period $T_k$.

An energy contribution of the processing block $B_i$ or of the processor $PR_i$ can then be defined in the execution of the global task when the processors of respective rank k operate with respective clock periods $T_k$. This contribution is denoted by $EC_i(T_i, T_{noti})$ which mainly depends on a clock period variable $T_i$ specific to the processor but which also depends, to a lesser extent, on the clock period variables $T_k$ of all the other processors; the notation $T_{noti}$ in the contribution $EC_i(T_i, T_{noti})$ denotes a vector which is the set of the clock periods $T_k$ with the exception of the period $T_i$.

The normalized energy contribution $EC_i(T_i, T_{noti})$ can be calculated by the following expression:

$$EC_i(Ti, Tnoti) = \frac{\rho_i E_i(T_i)}{\sum_k E_k(T_k)}$$

Where $\rho_i$ is the weight of the processor $PR_i$ in terms of number of clock cycles needed for the complete execution of the application over the time T0 with respect to the total number of cycles used by the application during this time:

$$\rho_i=N_i/\Sigma_K N_k$$

Figure 5:
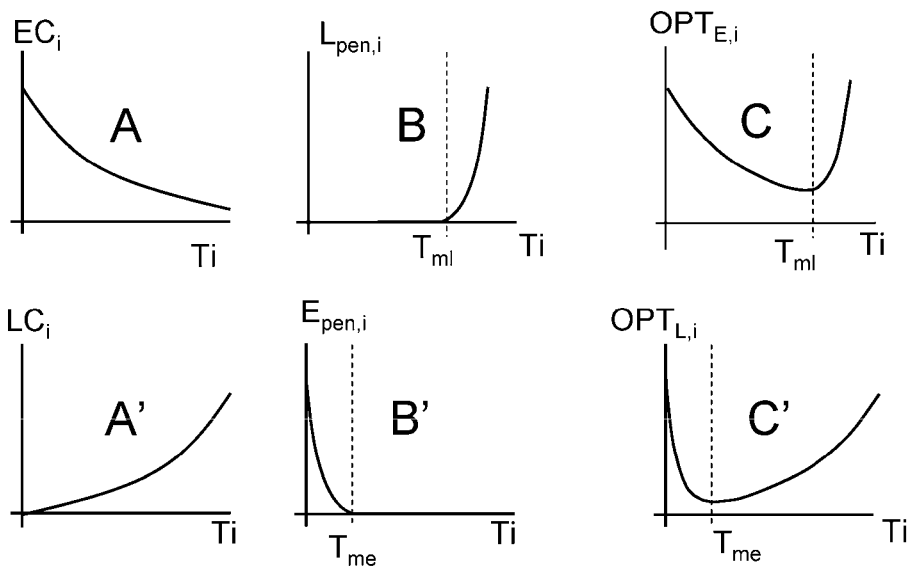
FIG. 5 shows variation curves for various optimization functions or sub-functions as a function of a variable which is the clock period.

The curve which shows the variation of the contribution $EC_i(T_i, T_{noti})$ as a function of $T_i$ is a curve of generally decreasing aspect shown schematically under the reference A in FIG. 5. The contribution is normalized and in the range between 0 and 1.

This energy contribution can form a main sub-function in the calculation of the optimization function for the block of rank i.

Optimization by the Latency Time:

Based on the same principles, a latency time contribution of the processor of rank i to the overall latency time can be used as a concept; this normalized contribution $LC_i$ may be written in the form:

$$LC_i(Ti, Tnoti) = \frac{\rho_i L_i(T_i)}{\sum_k L_k(T_k)}$$

$$\rho_i=N_i/\rho_k N_k$$

$\Sigma_k L_k(T_k)$ can be considered as the overall latency time, sum of all the latency times $L_k(T_k)$ of the various blocks or processors of rank k=1 to n. The notion of latency time will be reconsidered herein below.

The curve $LC_i$ as a function of $T_i$ (all other parameters constant) is a curve of generally increasing aspect shown schematically under the reference A' in FIG. 5. It is normalized and can vary between 0 and 1.

This contribution can, here again, form a main sub-function in the optimization calculation for the block of rank i.

In the case of parallel or staggered tasks, the latency time of a block may be considered as the time needed for executing a task in a given block. It may be broken down into a time for calculation and a time for communication between processors, the communication time can generally be ignored, the latency time due to the calculation often being dominant.

The overall latency time is defined by the period between the moment when a given data value enters into the application until the moment when a corresponding result is supplied to the output of the application. This latency time is imposed by the critical path for processing of the data, in other words the longest path (in time) that exists in the graph of the tasks of the application. If the individual latency times over this longest path are added, the overall latency time is obtained.

The application can be divided into sub-systems, with a first sub-system which has the longest latency time and others which have shorter latency times and the operation will preferably be optimized by considering each sub-system.

The penalty sub-functions, which express limits on maximum energy or on maximum execution time may be defined in the following manner:

Energy Constraint:

When the system executes an application, the processor of rank i consumes an energy $E_i(T_i)$. If it is desired that the total energy consumed by the integrated circuit be designed to be limited to a value $E_{max}$, the solutions that lead to it exceeding the value $E_{max}$ will be penalized.

This can be done by adding an energy penalty value $E_{pen,i}$ to the main optimization sub-function, when the latter is a latency time contribution and when the total energy consumed is greater than $E_{max}$. The penalty value is preferably calculated in the following manner:

the penalty value is zero if the total energy $\Sigma_k E_k(T_k)$ remains below $E_{max}$;
the penalty value is non-zero in the opposite case and preferably varies by rapidly increasing with the frequency $f_i = 1/T_i$; it is preferably equal to $E_{pen,i} = \alpha(T_{me} - T_i)$, where $T_{me}$ is the shortest clock period of the processor $PR_i$ that allows the constraint of an energy less than $E_{max}$ to be satisfied; $\alpha$ is a coefficient that determines the desired severity of the penalty.

In other words, by operating at the clock period $T_{me}$, all other things being equal, the overall energy consumed will be $E_{max}$; if this period is further reduced, the energy will be greater than $E_{max}$ and a penalty will be applied that will be higher the smaller that $T_i$ is compared to $T_{me}$ and will be higher the larger the severity coefficient a is chosen. But if $T_i$ is larger than $T_{me}$, a penalty will not be applied.

This penalty function is designed to eliminate the solutions with period $T_i$ that lead to the maximum total energy limit being exceeded.

The section B' of FIG. 5 shows the general aspect of the curve of penalty with energy limits as a function of the clock period of the processor in question.

2. Latency or Execution Delay Constraint:

The constraint giving rise to a penalty can be formulated using a value $L_{max}$ for the maximum acceptable latency (or execution delay) during the execution of the global task by the integrated circuit multiprocessors.

A latency penalty value $L_{pen,i}$ can be established for each processor, and this value is preferably calculated as follows:

the penalty value is zero if the total execution delay is less than or equal to $L_{max}$;
the penalty value is non-zero in the opposite case and increases with the period $T_i$; the value is preferably $L_{pen,i} = \alpha(T_i - T_{ml})$ where $\alpha$ is a severity coefficient (which could be the same as for the energy penalty) that it is desired to assign to the latency constraint, and $T_{ml}$ is the longest clock period of the processor of rank i that allows the maximum overall latency constraint $L_{max}$ to be satisfied.

This penalty function is designed to eliminate the solutions for the clock period which lead to the acceptable overall latency $L_{max}$ being exceeded.

The general aspect of the penalty sub-function as a function of the period Ti is that shown in the section B of FIG. 5.

The global optimization function calculated by each processing block is preferably then:

either the sum $OPT_{E,i}$ of the energy contribution $EC_i(T_i, T_{noti})$ and the latency time constrained penalty sub-function $L_{pen,i}$; the general aspect of this optimization function is that shown by the curve C in FIG. 5, which is the combination of the curves A and B; this function is an energy optimization function; its purpose is to minimize the energy consumption of the assembly, but it is constrained by a limit on acceptable latency;
or the sum $OPT_{L,i}$ of the latency contribution and the energy constrained penalty sub-function; the general aspect of this optimization function is that shown by the curve C' in FIG. 5, which is the combination of the curves A' and B'; this function is an optimization function for latency; it is designed to minimize the overall latency of the assembly, but it is constrained by a limit on acceptable energy consumption.

In the two cases, the optimization function is convex or quasi-convex, facing up if the optimization consists in the search for a minimum, or facing down if the optimization consists in the search for a maximum. The terms convex or quasi-convex are understood to mean the fact that the function exhibits a succession of two adjacent sections, one of which has a first derivative that is positive or zero and the other has a first derivative that is negative or zero, the word "quasi-convex" denoting the fact that the derivative may be zero over a certain range of the variable parameter $T_i$.

This convexity, or quasi-convexity, of the curve for all the processors will, in the general case, allow a point of equilibrium to be found.

Figure 6:
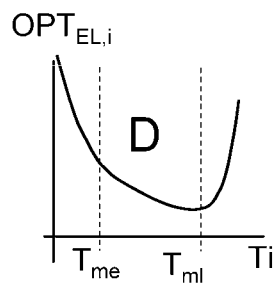
FIG. 6 shows an optimization function combining several sub-functions.

In one variant, an optimization function is established which is the sum of one of the two main functions (energy contribution or contribution to the latency time) and two penalty sub-functions in the presence of a constraint, one being a penalty with latency constraint and the other a penalty with energy constraint. In this case, the optimization function is represented by a curve which is the addition of the curves A, B and B', or else the addition of the curves A', B and B'. FIG. 6 shows such a function in the first case, which function may be written:

$$OPT_{EL,i} = EC_i(T_i, T_{noti}) + L_{pen,i} + E_{pen,i}$$

The equilibrium will not necessarily be acceptable in the case where the value $T_{ml}$ is less than the value $T_{me}$. There is indeed then a contradiction between the constraints: a solution which optimizes the energy constraint will violate the maximum latency constraint and vice versa.

The choice of the optimization function for energy or of the optimization function for latency will depend on the context, and it is possible to assign an energy optimization function to certain processors and a latency optimization function to others, according to the nature of the processors and of the application.

For example, if the energy constraint is used for one processor, exceeding maximum energy could be a trigger to reconfigure the multiprocessor system to allocate a part of its task to other processors.

The global search algorithm for the optimum is executed in a cyclic fashion by each processing block $B_i$ in the following manner:

the processing block of rank i acquires the characteristic data values $S_k$ (for example respective energy contributions) from the other processors, being a set $S_{noti}$;
it converts the optimization function (function of $T_i$ and of the vector $S_{noti}$) into a scalar function of $T_i$, the values $S_{noti}$ being considered as fixed parameters during the execution of one cycle of the algorithm;
it calculates the value of $T_i$ that corresponds to an optimum value (maximum or minimum) of this function of $T_i$, within a range of possible clock periods $[T_{min}, T_{max}]$, which range may be the same for all the processors.

The calculation of the optimum value of $T_i$ for the processor in question can be carried out by successively calculating the value of the optimization function for N clock periods values going from $T_{min}$ to $T_{max}$, preferably N evenly distributed values between $T_{min}$ and $T_{max}$. For each period value, starting for example from $T_{min}$, the value of the optimization function is calculated taking into account the current value of the vector $S_{noti}$; the maximum from among the N calculated values is sought and the clock period corresponding to this maximum is applied to the processor; or else, the values starting for example from $T_{max}$ are successively calculated and, as long as the optimization function is decreasing (assuming that the optimum is a minimum), the value of the clock period is decremented; the process is stopped when it starts to increase and a clock period that corresponds to the minimum thus found is applied to the processor.

Alternatively, and in a particularly advantageous manner in terms of processing time, a progressive search for the optimum can suffice, in other words where the search algorithm does not calculate a multiplicity of values for the optimization function before selecting the best and applying it to the processor, but it calculates, during one cycle, three values of the optimization function, one corresponding to the current period of the clock, the second to a slightly greater period and the third to a slightly smaller period. In practice, the period values are taken in a discrete monotonic succession of N possible values and the calculation is made for the two closest values that encompass the current value. The calculation algorithm determines whether one of these period values leads to a value of optimization function that is better than the value for the current period, and it then immediately applies this new clock period to the processor. Otherwise, it conserves the current clock period and the processor continues to run with this period. The algorithm is re-executed in a cyclic manner within each block, with the new value of clock period if it has changed, or with the old one if it has not changed, and with values of $S_i$ and $S_{noti}$ which could have changed in the interval.

By way of example, the difference between two adjacent values of clock periods can be 0.5 nanoseconds, corresponding to a step of around 5 MHz, for clock frequencies in a range going from 100 MHz ($T_{max}$=10 nanoseconds) to 300 MHz ($T_{min}$=3 nanoseconds); the distribution of the values of $T_i$ can for example be linear, either in period, or in frequency, but other distributions may be envisioned.

Figure 7:
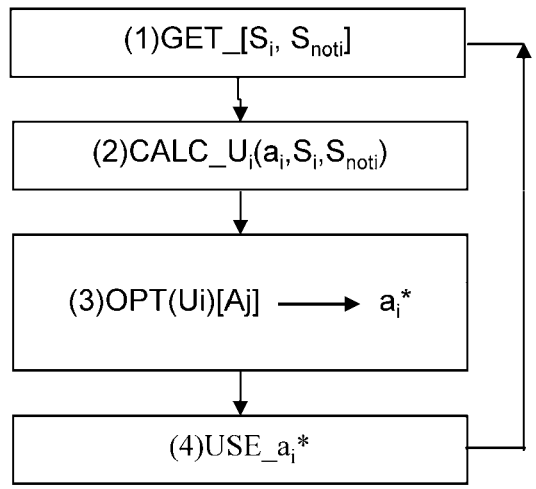
FIG. 7 shows an optimization process flow diagram.

FIG. 7 summarizes the general principle of the optimization according to the invention:

a step referenced (1)GET_[$S_i$,$S_{noti}$]: within each block, a characteristic data value $S_i$ relating to this block is determined and the corresponding characteristic data $S_k$, in other words a vector $S_{noti}$ of n-1 data values corresponding to k=1 to n except k=i, is received from the other blocks. The characteristic data value depends on a variable parameter a relating to the block, where this parameter can be the clock period $T_i$ of the processor of the block; the characteristic data value of the block i and the characteristic data relating to the other blocks can for example be the contributions to the energy consumption as previously explained; it may also be envisioned for the characteristic data value transmitted by the blocks to all the other blocks to be simply the variable data value a itself, it being the responsibility of each of the blocks to calculate the contribution to the energy consumption of the other blocks using the various values $a_k$, but it will be understood that this will considerably increase the calculation load for each of the blocks. The data value $S_i$ for a block can result from a calculation within the block (for example, the calculation of an energy contribution) or from a measurement by a sensor (for example in the case where the characteristic data value is a local temperature).

a step referenced (2)CALC_U$_i$($a_{Si}$,$S_{noti}$): using the various data values $S_i$, $S_{noti}$, the block of rank i calculates an optimization function U$_i$($a_i$, $S_i$, $S_{noti}$) which depends on the variable $a_i$ and on the values $S_i$, $S_{noti}$.

a step referenced (3)OPT(U$_i$)[Ai]: the best value of U$_i$ is sought over the field Aj of the possible values of $a_i$ and, as explained above, this search may, at each step, only be applied to the two values adjacent to the current value of $a_i$. A new value $a_i$* of the variable parameter is obtained.

and lastly, a step referenced (4)USE_ai*: the new parameter $a_i$*, for example a new operating frequency, is applied to the processing block of rank i.

Figure 8:
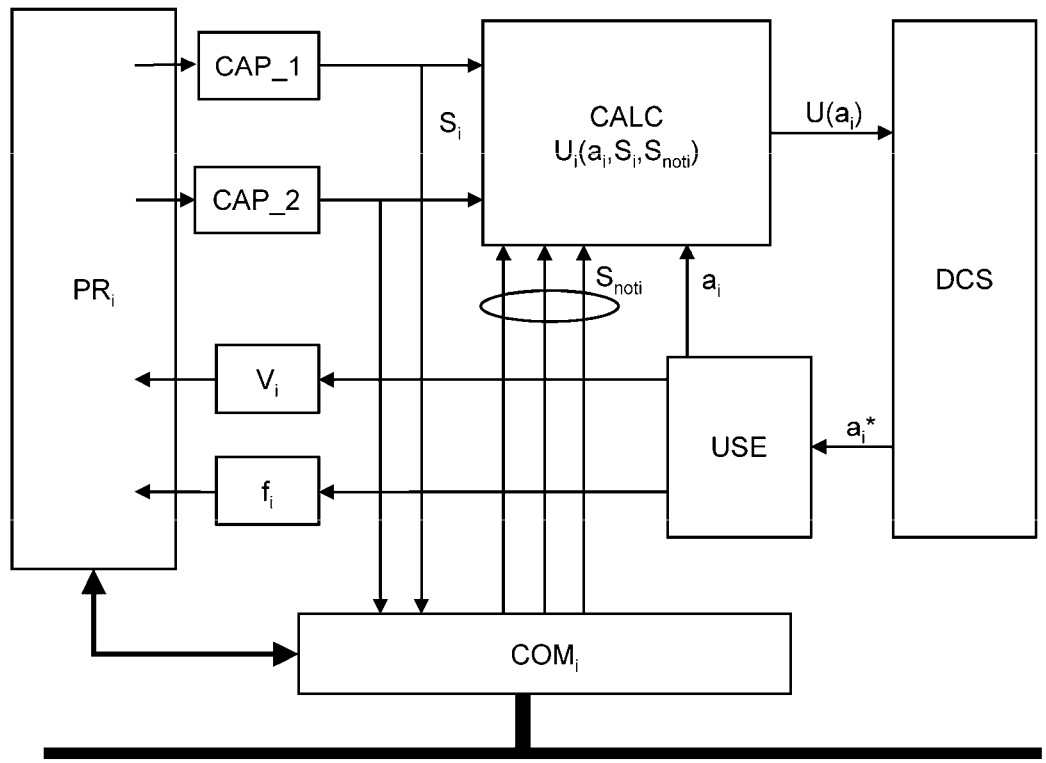
FIG. 8 shows one organization of processing block for the execution of the process of optimization.

FIG. 8 describes, in the form of function blocks, the organization of a processing block that allows this method of optimization to be executed. It is assumed that there is only one processor in the processing block and the other elements, such as memories or peripherals that can be associated with the processor in the block, have not been shown. Only the processor PR$_i$ and the communication means COM$_i$, allowing the data $S_i$ and $S_{noti}$ to be exchanged between the processor of rank i and the other processors, have been shown. An element CALC for calculating the value of the optimization function is shown separate from the processor, but it can be a part of the processor. It receives the data $S_i$ and $S_{noti}$. The data value $S_i$ may come from the processor or, in some cases, from a sensor CAP_1, or even from several sensors CAP_1, CAP_2, etc. The calculated values of the optimization function U$_i$($a_i$,$S_i$, $S_{noti}$) for various values of $a_i$ are compared in a decision block DCS; the selected value $a_i$* supplying the best value of optimization function is utilized in a usage block USE; this block applies the value $a_i$* to the processor, for example in the form of a new operating frequency $f_i$ but may also, in some cases, control other actions, such as for example the application to the processor of a supply voltage $V_i$ chosen in relation to the parameter $a_i$*, for example in the case where it is considered that a modification of clock frequency must necessarily be accompanied by a modification of supply voltage.

Figure 9:
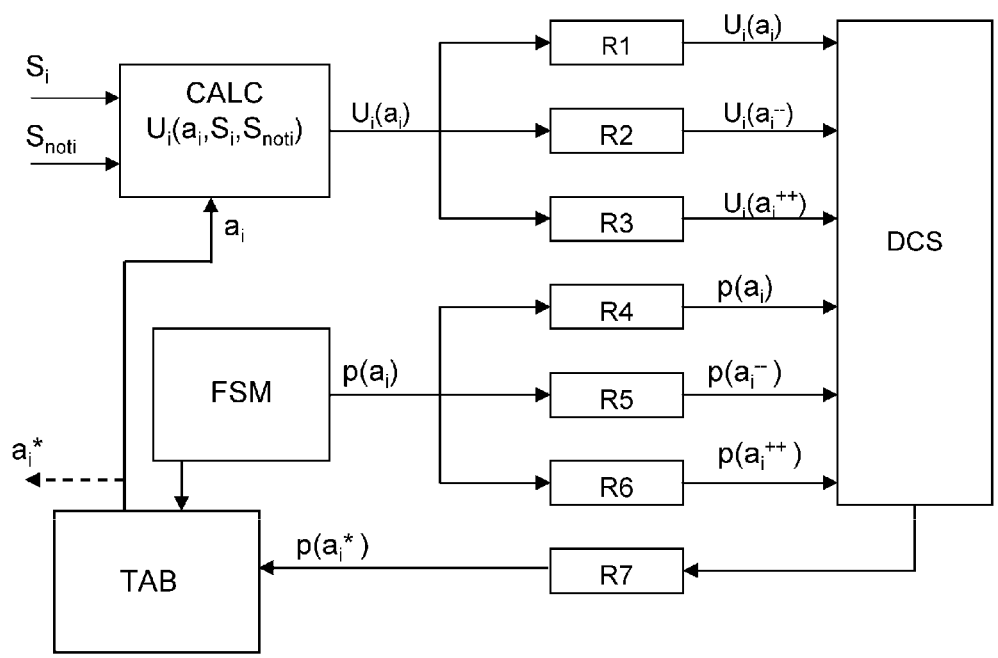
FIG. 9 shows one organization of optimization calculation being applied to three adjacent values of the variable parameter of the optimization function.

FIG. 9 shows schematically the operation of a state machine allowing the execution of a search for a new variable parameter value $a_i$* based on the calculation of three values of the optimization function corresponding to the current value of $a_i$ and to two close values encompassing it in the discrete series of the N possible values of this parameter. In this FIG. 9 can be seen seven digital registers:

R1, R2, R3 for storing three possible values of the optimization function, respectively the values for $a_i$, $a_i^{--}$, and $a_i^{++}$, $a_i$ being the current value of the variable parameter, $a_i^{--}$ being the value immediately below in the series of the N values, and $a_i^{++}$ being the value immediately above;

R4, R5, R6 for storing the corresponding addresses p($a_i$), p($a_i^{--}$), p($a_i^{++}$) of the values of the variable parameter, the possible values of the variable parameter being recorded in an addressable table TAB;

R7 for storing the address p($a_i$*) of the new variable parameter $a_i$* chosen by the decision circuit DCS and which is either p($a_i$), or p($a_i^{--}$), or p($a_i^{++}$).

A control block FSM manages the address values to be established during the process and applies these addresses, on the one hand, to the table TAB in order to extract from it the values of the parameter, and on the other hand, to the registers R4, R5, R6, in order to store these addresses in them.

The state machine operates according to four states:

State E1: the block FSM stores in the register R4 the current value of address p($a_i$) of the variable parameter($a_i$), and controls the transmission of the corresponding parameter $a_i$ from the table TAB to the block for calculating the optimization function; the latter stores the result of the calculation U$_i$($a_i$) in the register R1;

State 2: using the current value $a_i$, the block FSM generates the address p($a_i^{--}$) of the value immediately below and stores this value in the register R5; it extracts from the table TAB the corresponding parameter value $a_i^{--}$ and sends it to the block for calculating the optimization function; the result of the calculation $U_i(a_i^{--})$ is stored in the register R2;

State 3: using the current value $a_i$, the block FSM generates the address $p(a_i^{++})$ of the value immediately above and stores this value in the register R6; it extracts from the table TAB the value of corresponding parameter $a_i^{++}$ and sends it to the block for calculating the optimization function; the result of the calculation $U_i(a_i^{++})$ is stored in the register R3;

State 4: the decision block DCS reads the results stored in the registers R1, R2, R3. It compares the contents of R1 and R2 together with the contents of R1 and R3; it stores in R7 the address contained in R5 if the result in R2 is better than the result in R1; it stores in R7 the address contained in R6 if the result in R3 is better than the result in R1; and lastly, it stores in R7 (or conserves in R7) the result contained in R4 if the result in R2 or R3 is not better than the result in R1.

Finally, the result $p(a_i^*)$ contained in R7 is decoded by the table TAB in order to transmit the value $a_i^*$ to the processor so it can be used in place of the preceding value $a_i$.

The invention claimed is:

1. A method for optimizing operation which is applicable to an integrated circuit chip comprising several processing blocks capable of executing respective tasks within a given application, each processing block comprising at least one processor, the method comprising, for each processing block:
   execution of a task by the processor under the control of at least one variable parameter, such as the operating frequency or period of the processor or its supply voltage;
   determination in real time of at least one characteristic data value associated with the processing block during its operation, such as for example the temperature of the block or the power dissipated in the block or a latency time of the block, this characteristic data value being dependent on the value of the variable parameter;
   transfer of the characteristic data value to the other blocks and the reception of the corresponding characteristic data from the other blocks;
   calculation in the block of various values for an optimization function dependent on the characteristic data value of the block, on the characteristic data from the other blocks, and on the variable parameter, the function being calculated for the current value of the variable parameter of the block and for other possible values of this parameter;
   selection, from among the various values of the variable parameter, of that which gives the best value for the optimization function; and
   application of this selected value of the variable parameter to the processor for the remainder of the execution of the task.

2. The method according to claim 1, wherein the variable parameter is the frequency or the period of a clock included in the processing block, this clock defining an elementary processing cycle time of the processor.

3. The method according to claim 2, wherein the characteristic data value is related to the power consumed by the processing block during its operation.

4. The method according to claim 3, wherein the characteristic data value is a contribution of the processing block to the overall energy consumption of the chip.

5. The method according to claim 3, wherein the optimization function is a function for minimization of a power consumption and is the sum of a main sub-function, which represents a normalized energy contribution of the processing block, and a secondary sub-function which is a penalty in the presence of a maximum acceptable constraint on latency time for the execution of a task.

6. The method according to claim 2, wherein the characteristic data value is a contribution of the processing block to an overall latency time for the calculations performed by the chip in an application where it is used.

7. The method according to claim 6, wherein the optimization function is a function for minimization of the overall latency time and is the sum of a main sub-function which represents a normalized contribution to latency time induced by the processing block, and of a secondary sub-function which is a penalty in the presence of a maximum acceptable constraint on energy consumption for the chip.

8. The method according to claim 2, wherein the calculation of the optimization function and the selection of a variable parameter value comprise
   determination of the values of the optimization function for a current value of the variable parameter and two other values encompassing this current value in a monotonic succession of possible values; and
   comparison of the value of the function for the current parameter and for the two other parameter values, and the selection of a new parameter value which is one of the two other values if and only if this other value yields a better value of optimization function.

9. The method according to claim 1, wherein the characteristic data value is associated with the power consumed by the processing block during its operation.

10. The method as claimed in according to claim 9, wherein the characteristic data value is a contribution of the processing block to the overall energy consumption of the chip.

11. The method according to claim 9, wherein the optimization function is a function for minimization of a power consumption and is the sum of a main sub-function, which represents a normalized energy contribution of the processing block, and a secondary sub-function which is a penalty in the presence of a maximum acceptable constraint on latency time for the execution of a task.

12. The method as claimed in claim 9, wherein the calculation of the optimization function and the selection of a variable parameter value comprise
   determination of the values of the optimization function for a current value of the variable parameter and two other values encompassing this current value in a monotonic succession of possible values; and
   comparison of the value of the function for the current parameter and for the two other parameter values, and the selection of a new parameter value which is one of the two other values if and only if this other value yields a better value of optimization function.

13. The method according to claim 1, wherein the characteristic data value is a contribution of the processing block to an overall latency time for the calculations performed by the chip in an application where it is used.

14. The method according to claim 13, wherein the optimization function is a function for minimization of the overall latency time and is the sum of a main sub-function which represents a normalized contribution to latency time induced by the processing block, and of a secondary sub-function which is a penalty in the presence of a maximum acceptable constraint on energy consumption for the chip.

15. The method according to claim 1, wherein the calculation of the optimization function and the selection of a variable parameter value comprise
   determination of the values of the optimization function for a current value of the variable parameter and two other values encompassing this current value in a monotonic succession of possible values; and comparison of the value of the function for the current parameter and for the two other parameter values, and the selection of a new parameter value which is one of the two other values if and only if this other value yields a better value of optimization function.

16. An integrated circuit chip comprising several processing blocks each capable of executing a respective task depending on the application in which the chip is used, each processing block comprising at least one processor for executing the task;

a communications element enabling the communication between this block and the other blocks;

a means of action on the operation of the processor in order to modify a variable parameter of this operation such as the operating frequency or period of the processor or its supply voltage;

a means of determination, in real time, of at least one characteristic data value associated with this block during its operation, such as for example the temperature of the block or the power dissipated in the block or a latency time for calculations executed in the block, this characteristic data value depending on the value of the variable parameter;

means for transferring the characteristic data value to the other blocks and for receiving the corresponding characteristic data from the other blocks;

means for calculating various values of an optimization function depending on the characteristic data value of the block, on the characteristic data from the other blocks, and on the variable parameter, the function being calculated for the current value of the variable parameter of the block and for other possible values of this parameter;

means for selecting from among the various values of the variable parameter that which yields the best value for the optimization function; and means for transmitting the value selected to the means of action for it to be applied to the processor.

* * * * *